United States Patent [19]

Russell

[11] 4,376,260

[45] Mar. 8, 1983

[54] SYSTEM FOR COMPENSATING FOR INTENSITY VARIATIONS AND BEAM LANDING ERRORS IN FLAT PANEL DISPLAY DEVICES

[75] Inventor: John P. Russell, Pennington, N.J.

[73] Assignee: RCA Corporation, New York, N.Y.

[21] Appl. No.: 311,258

[22] Filed: Oct. 14, 1981

[51] Int. Cl.³ .................... H01J 29/70; H01J 29/72
[52] U.S. Cl. ................................. 315/366; 315/383
[58] Field of Search ............ 315/366, 370, 383, 10; 313/422; 358/67, 68, 69

[56] References Cited

U.S. PATENT DOCUMENTS

| | | | |
|---|---|---|---|
| 4,099,092 | 7/1978 | Bristow | 315/10 |
| 4,117,368 | 9/1978 | Marlowe et al. | 313/422 |
| 4,121,137 | 10/1978 | Credelle | 315/366 |
| 4,126,814 | 11/1978 | Marlowe | 315/307 |
| 4,183,053 | 1/1980 | Tomii et al. | 358/60 |

Primary Examiner—Theodore M. Blum
Attorney, Agent, or Firm—Eugene M. Whitacre; Dennis H. Irlbeck; Lester L. Hallacher

[57] ABSTRACT

A system for correcting for intensity variations and electron beam landing errors in a flat panel display device includes two compensation means. The first compensation means applies a continuously varying voltage to the modulation electrodes to add a varying current to the electron beam current. The compensation current offsets the intensity variations of the electron beam. The second compensation means applies an averaged position signal to the modulation electrodes to compensate for beam landing errors of the electron beam.

5 Claims, 5 Drawing Figures

SYSTEM FOR COMPENSATING FOR INTENSITY VARIATIONS AND BEAM LANDING ERRORS IN FLAT PANEL DISPLAY DEVICES

BACKGROUND OF THE INVENTION

This invention relates generally to modular flat panel display devices, and particularly to a system for correcting for intensity variations and electron beam landing errors in such devices.

A modular flat panel display device, in which the instant invention can be utilized, is described in U.S. Pat. No. 4,117,368 issued to Marlowe, et al. The Marlowe et al. device consists of an evacuated envelope which is divided into channels by a plurality of insulating vanes. Each of the channels includes guide meshes for propagating electron beams along the lengths of the channels. When a particular line of the visual display is to be produced, the electron beams are ejected from the guide meshes and travel toward the display screen. The vanes support deflection electrodes which are biased with varying deflection potentials. These deflection potentials cause the electrons traveling from the guide meshes to the display screen to be scanned transversely across the channels. The electron beams of all the channels are simultaneously ejected from between the guide meshes so that a portion of the same horizontal line of the visual display is simultaneously generated across each of the channels.

Because the visual display of a modular display device is generated across a plurality of channels, the brightness of each channel must be uniform within the perception capability of the human eye. U.S. Pat. No. 4,126,814 issued to Marlowe discloses a system for uniformly controlling the visual display brightness of a modular flat panel display device or the type described in U.S. Pat. No. 4,117,368. The display brightness of the modules must be uniform within approximately 1% to assure that the seams between the modules are invisible. In a modular display device every channel uses a different electron gun. The electron guns and their associated circuitry typically do not have uniform transfer characteristics and, therefore, the display brightness of the channels will vary along with the transfer characteristics variations. The system described in the Marlowe U.S. Pat. No. 4,126,814 addresses this problem by storing the brightness drive voltages required to produce 64 different predetermined levels of picture brightness for each of the electron guns. The stored drive voltages are selected from a voltage range which is divided into 256 equal incremental voltages. The electron gun is driven by the incremental voltages and the voltages produced on an electron collector are compared with a reference voltage. The incremental voltage which brings the collector voltage up to the reference voltage is then stored. This procedure is repeated for 64 reference voltages so that 64 to 256 incremental drive voltages are stored. Accordingly, uniform brightness for all modules in the display is achieved because the brightness levels for all the modules are referenced to the same 64 reference voltages.

The brightness uniformity control system described in the Marlowe U.S. Pat. No. 4,126,814 operates satisfactorily for the purposes intended. However, the electron beams propagate in an oscillatory manner between the guide meshes. This inherently results in wobble of the electron beams during the travel from the guide meshes to the screen. This wobble introduces permanent deleterious display characteristics which are unique to each display device, and to each module within the display device. The first such characteristic caused by electron beam wobble is a sinusoidal variation of the display brightness in the direction of the electron beam propagation between the beam guides. The second deleterious display characteristics induced by electron beam wobble is that of causing the electron beams to land at improper positions on the screen. This characteristic can also be caused by permanent structural features of the display device. Because the features are permanent, the correction for the landing errors they induce also are permanent. One segment of every horizontal line across the display is generated by each of the channels so that each channel contributes a portion of each horizontal line. Electron beam landing errors can cause the line segments of adjacent channels to be slightly displaced thereby disrupting the continuity of the horizontal line.

The instant invention overcomes these deficiencies by the provision of compensation circuitry for overcoming the deleterious display characteristics introduced by electron beam wobble and by structural features of the display device.

SUMMARY OF THE INVENTION

A system for compensating for electron beam intensity variations and landing errors in a flat panel display device includes two compensation means. The first compensation means applies a continuously variable signal to a modulator to compensate for intensity variations of the electron beam. The second compensation means applies an averaged position signal to the modulator to compensate for landing errors of the electron beam.

DETAILED DESCRIPTION OF THE PREFERRED EMBODIMENT

Figure 1:
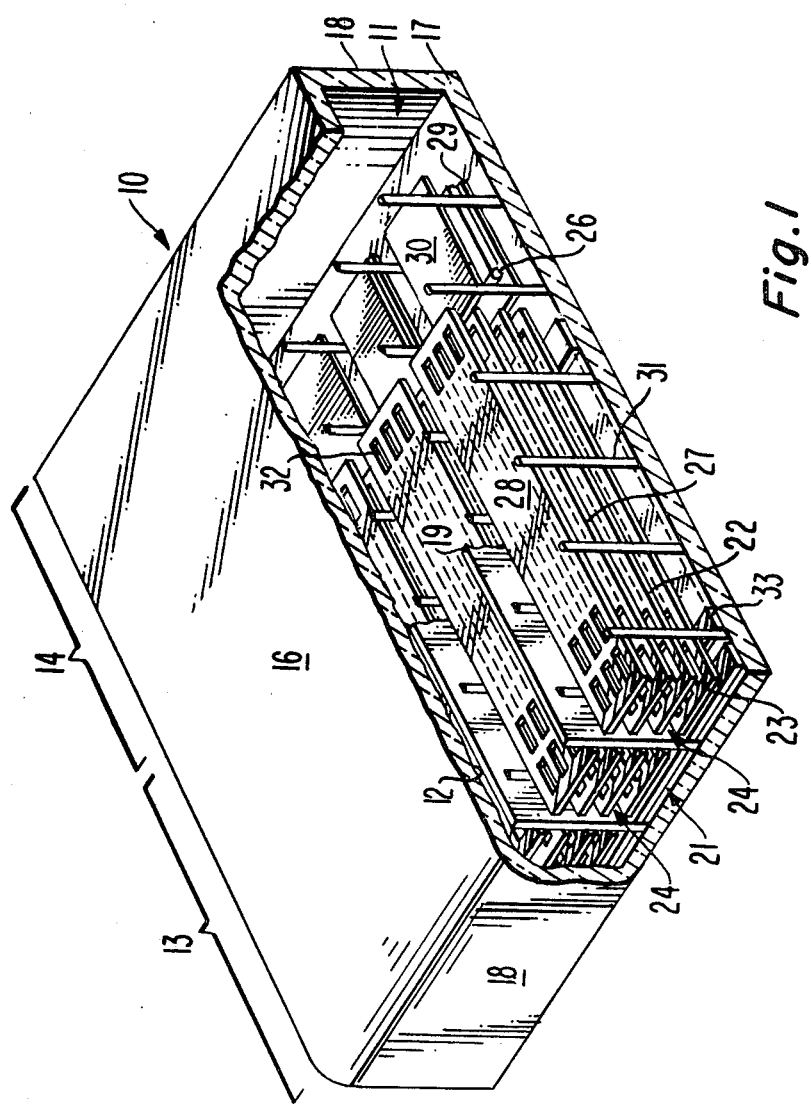
FIG. 1 is a perspective view, partially broken away, of a flat panel display device in which the instant invention can be utilized.

In FIG. 1, a flat panel display device 10 in which the preferred embodiment can be utilized includes an evacuated envelope 11 having a display section 13 and an electron gun section 14. The envelope 11 includes a faceplate 16 and a baseplate 17 held in a space parallel relationship by sidewalls 18. A display screen 12 is positioned along the faceplate 16 and gives a visual output when struck by electrons.

A plurality of spaced parallel support vanes 19 is arranged between the faceplate 16 and the baseplate 17 to provide the desired internal support against external 17 to provide the desired internal support against external atmospheric pressure and to divide the envelope 11 into a plurality of channels 21. A beam guide assembly, including spaced parallel beam guide meshes 22 and 23, a focus mesh 27, and an acceleration mesh 28 extends transversely across and longitudinally along each of the channels 21. A line cathode 26 is supported between modulation electrodes 29 and 30 to emit electrons into the spaces 24 between the guide meshes 22 and 23 in each channel 21 so that the electrons propagate the lengths of the channels. The channels 21 each include an electron gun for the three colors used to produce a color display. The electron guns include a portion of the line cathode and the modulation electrodes 29 and 30 which are biased to cause electrons to enter the spaces 24. Each of the meshes 22, 23, 27 and 28 contains a plurality of apertures 32, which are arranged in columns longitudinally along the meshes and in rows transversely across the meshes. Disposed on the inside surface of the back plate 17 is a plurality of extraction electrodes 33, which extend transversely across the entire transverse dimension of the envelope 11. When a particular horizontal line of the visual display is to be displayed on the display screen 12, a negative voltage is applied to one of the extraction electrodes 33 so that the electrons are ejected from between the guide meshes 22 and 23 of every channel and travel to the screen 12 to produce one line of the visual display. Accordingly, each of the channels 21 contributes to the entire horizontal line of the visual display and for this reason uniform brightness control across the visual display is required.

Electron beam wobble is an inherent characteristic of flat panel display devices and originates in the trajectories of the electrons between the guide meshes. The electrons propagating between the upper and lower guide meshes follow an oscillatory motion which inherently causes some beam wobble as the electrons travel from the guide meshes toward the screen after being extracted from propagation between the guide meshes. The wobble is enhanced by structural imperfections in the beam guide meshes and other components of which the display device is comprised. Typically, the deleterious effects of beam wobble are permanent and unique to each display device and to each channel within the display device. Thus, brightness variations along adjacent channels ordinarily will be different for the two channels, but will be permanent. The same is true of beam landing errors caused by wobble and structural imperfections. However, because the effects are permanent, compensation can be built into each display device as the last step of manufacture.

Figure 2A:
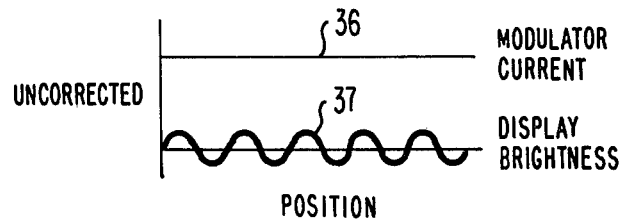
FIGS. 2a and 2b, respectively, show how display brightness varies with constant grid current and how brightness is constant when the grid current is varied.
Figure 2B:
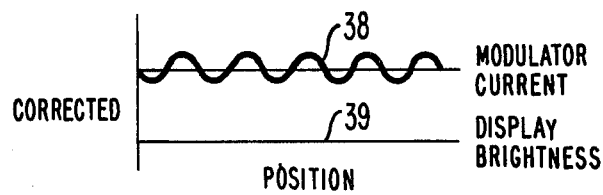

FIG. 2a shows the effect of electron beam wobble on display brightness and FIG. 2b shows the manner of correcting for such wobble induced brightness variation. In FIG. 2a, a modulator current curve 36 is constant, which is typical of the operation of prior art flat panel display devices. This current is the result of a voltage which is applied to the modulation electrodes 29 and 39 (FIG. 1) to attract electrons emanating from the cathode 26 into the space 24 between the guide meshes 22 and 23. With a modulator current constant, the display brightness along the lengths of the individual channels varies sinusoidally, as shown by a curve 37. The frequency and amplitude of the display brightness variation is characteristic for each channel of the display device and can be measured and recorded as a final step in the production of the display device. FIG. 2b illustrates a technique for correcting the sinusoidal variation of the display brightness. A small sinusoidal voltage is applied to the modulation electrodes 29 and 30 (FIG. 1). This voltage adds a sinusoidal current 38 to the current of the electron beam during injection into the space 24 between the beam guides 22 and 23. The added current compensates for the sinusoidal brightness variation and thus has the same frequency and is 180° out of phase with the display brightness curve 37 of FIG. 2a. The amplitude of the compensation current is selected to cause the brightness variation to be exactly offset. The result is a uniform display brightness as represented by a line 39 in FIG. 2b. Accordingly, when the display device is initially manufactured, the amplitude, phase and frequency of the display brightness variation for each channel is measured and stored in a memory unit, such as the type of memory unit disclosed in the Marlowe U.S. Pat. No. 4,126,814. A compensating current is then added to the electron beam current during the operation of the display device.

The addition of the compensating sinusoidal current to the electron beam current corrects for wobble induced display brightness variations but has no effect on another wobble induced deleterious display characteristic. Electron beam wobble also causes the electron beams to impact, or land, on the screen at positions different from those intended. The effect of beam landing errors can be understood from FIG. 3 which shows portions of two channels 41 and 42 and the horizontal line segments 41a–41n and 42a–42n, respectively, generated by each of the channels. The horizontal line segments 41a through 41n within the channel 41 are evenly spaced and of uniform brightness and thus are those line segments which would be generated in the absence of any electron beam wobble or structural imperfections. The horizontal line segments 42a through 42n within the channel portion 42, illustrate the nonuniformity of line spacing caused by beam landing errors. The addition of a sinusoidal compensation current causes the brightness of the line segments 42a through 42n to be uniform, but the spacing between the line segments remains unchanged. Accordingly, many of the line segments, such as 41n and 42n for example, are not horizontally aligned, and the misalignment would be objectionably noticeable to the viewer. All the line segments of all the channels are generated by the electron beams at a point at a time and, therefore, the manner of correcting for beam landing errors can be understood by considering individual points along a line segment.

Assume that the electron beam lands at a point $(x_V, y_H)$ when it should properly land at a point $(x_c, y_c)$. The line which contains the point is displaced from the correct position and the display quality is substantially degraded. By measuring the landing errors during factory adjustment, the landing errors can be stored in a memory and measured relative to the nearest correct landing position. During operation, as the electron beam is scanned across the faceplate, the memory is interrogated and compensation signal is applied to the beam causing the beam to appear to land at the correct position $(x_c, y_c)$.

Several types of beam landing errors can be distinguished:

1. Vertical landing error but no horizontal landing error.
2. Horizontal landing error but no vertical landing error.
3. Both horizontal and vertical landing errors.

In the first type of error, there is an error in the x coordinate landing position but the y coordinate landing position is correct. The compensation for this error is obtained by weighting the average of the two signals which correspond to the nearest correct landing positions on opposite sides of the erroneous landing position $(x_v, y_c)$. Identifying the two nearest correct landing positions as $(x_1, y_c)$ and $(x_2, y_c)$ having corresponding signals $S_1$ and $S_2$, the compensation signal $S(x_v, y_c)$ for the position $(x_v, y_c)$ is given by:

$$S(x_v, y_c) = \frac{S_2(x_v - x_1) + S_1(x_v - x_2)}{(x_1 - x_2)} \quad (1)$$

In the second type of landing error the x coordinate is correct but the y coordinate is erroneous and the method used in the case above may be used again. The corrected signal for the erroneous landing point $(x_c, y_H)$ is obtained by weighting the average of the two signals which correspond to the nearest correct landing positions on opposite sides of $(x_c, y_H)$. Identifying these two nearest correct landing positions as $(x_C, y_1)$ and $(x_C, y_2)$ having corresponding signals $S_1$ and $S_2$ the compensation signal $S(x_C, y_H)$ is given by:

$$S(x_C, y_H) = \frac{S_2(y_H - y_1) + S_1(y_H - y_2)}{y_1 - y_2} \quad (2)$$

The third type of landing error is the most common and is a combination of the two types described above, so that both the x and y coordinates are erroneous. The compensation signal for the erroneous landing position $(x_v, y_H)$ is obtained from a weighted average of the two signals which correspond to the nearest correct landing positions on opposite sides of the erroneous position $(x_v, y_H)$. Identifying the two nearest correct landing positions as $(x_1, y_1)$ and $(x_2, y_2)$ having corresponding signals $S_1$ and $S_2$ the compensation signal $S(x_v, y_H)$ is given by:

$$S(x_v, y_H) = \frac{S_2\left[\sqrt{(x_v - x_1)^2 + (y_H - y_1)^2}\right] + S_1\left[\sqrt{(x_v - x_2)^2 + (y_H - y_2)^2}\right]}{\sqrt{(x_1 - x_2)^2 + (y_1 - y_2)^2}} \quad (3)$$

Figure 3:
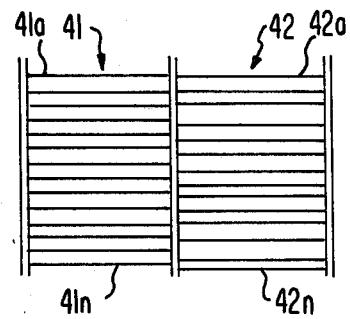
FIG. 3 shows how electron beam landing errors cause displacement of the horizontal line segments generated in adjacent channels.
Figure 4:
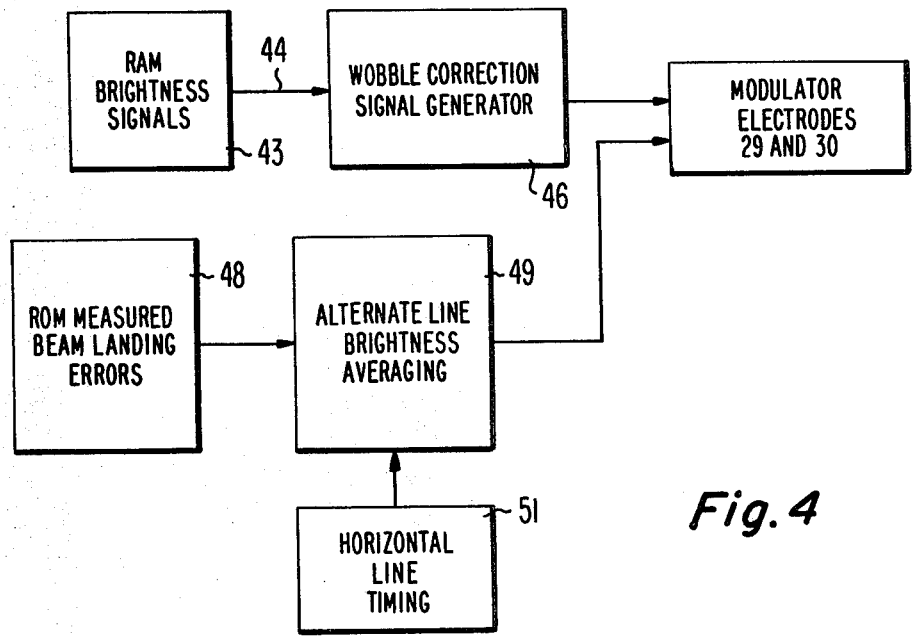
FIG. 4 is a preferred embodiment of the instant invention.

FIG. 4 is a preferred embodiment of a system for compensating for the sinusoidal display brightness variation illustrated in FIG. 2a and for the horizontal line segment displacement illustrated in channel 42 of FIG. 3. A random access memory (RAM) provides brightness signal on the output leads 44 in a manner described in the Marlowe U.S. Pat. No. 4,126,814. In the Marlowe system, the output leads 44 would be directly connected to the modulator electrodes 29 and 30 as shown in the Figure. A signal generator 46 is positioned between a RAM 43 and the modulation electrodes 29 and 30 and is used to generate a sinusoidal signal which is out of phase with the display brightness variation. This voltage adds a compensation current to the electron beam current so that the display brightness is uniform in the manner shown by line 39 of FIG. 2b.

Beam landing errors are compensated for using a memory device 48 such as a RAM or ROM to store the beam landing errors which are measured after the display device is completed. In operation, as the electron beam is scanned across a horizontal line segment such as one of the segments 42a through 42n of FIG. 3, the measured landing errors are provided to an alternate line brightness averaging circuit 49 by the memory 48. The averaging circuit 49 averages the erroneous landing position with the two nearest correct landing positions in accordance with equation (3) hereinabove to apply a compensation voltage to the landing position signal prior to its being applied to the modulation electrodes 29 and 30. The alternate line brightness averaging circuit 49 can be a microprocessor and the circuitry therein is very similar to the commonly available hand held pocket calculators having the capability of adding, subtracting, squaring annd taking square roots and thus is within the purview of those skilled in the art.

The horizontal line timing circuit 51 provides the landing position signals and times the averaged correction signals from the averaging circuit 49. This circuit therefore is the same as that which times the extraction electrodes 33 of FIG. 1 as described in the Marlowe U.S. Pat. No. 4,126,814.

I claim:

1. A system for compensating for intensity variations and electron beam landing errors in a flat panel display device having at least one beam guide for propagating said electron beam and a modulator for varying said electron beam in accordance with video information comprising:
   first means for applying a continuously variable signal to said modulator to compensate for intensity variations of said electron beams;
   second means for applying an averaged position signal to said modulator to compensate for landing errors of said electron beam.

2. The system of claim 1 wherein said first means is a sinusoidal signal generator.

3. The system of claim 2 wherein the output of said sinuosoidal generator has a phase 180° out of phase with said intensity variations.

4. The system of claims 1 or 2 or 3 wherein said averaged position signal from said second means is the average of the two nearest correct landing positions.

5. The system of claim 4 wherein said averaged position signal is defined by the relationship $$S(x_v, y_H) = \frac{S_2\left[\sqrt{(x_v - x_1)^2 + (y_H - y_1)^2}\right] + S_2\left[\sqrt{(x_v - x_2)^2 + (y_H - y_2)^2}\right]}{\sqrt{(x_1 - x_2)^2 + (y_1 - y_2)^2}}$$

where:
   $S_1$ and $S_2$ are signals representing the two nearest correct landing positions,
   $x_1 \ y_1$ is one of the nearest correct landing positions,
   $x_2 \ y_2$ is the other nearest correct landing positions,
   $S(x_v, y_H)$ is the compensation signal for the landing position $(x_V, y_H)$.

* * * * *

UNITED STATES PATENT AND TRADEMARK OFFICE
CERTIFICATE OF CORRECTION

PATENT NO. : 4,376,260
DATED : March 8, 1983
INVENTOR(S) : John Patrick Russell

It is certified that error appears in the above—identified patent and that said Letters Patent is hereby corrected as shown below:

Column 2, line 63 and 64 are redundant, cancel line 63 in its entirety, line 64, cancel "17".

Signed and Sealed this

Thirty-first Day of May 1983

[SEAL]

Attest:

DONALD J. QUIGG

Attesting Officer     Acting Commissioner of Patents and Trademarks